United States Patent [19]

Heine et al.

[11] Patent Number: 4,992,686
[45] Date of Patent: Feb. 12, 1991

[54] SINGLE HOUSING STEPPER MOTOR

[75] Inventors: Gunter K. Heine, Oswald Kewert, Bernard Michael Seeger, Santa Cruz County; Enrique G. Klein, Santa Clara County, all of Calif.

[73] Assignee: Seagate Technology, Inc., Scotts Valley, Calif.

[21] Appl. No.: 300,486

[22] Filed: Jan. 23, 1989

Related U.S. Application Data

[63] Continuation-in-part of Ser. No. 296,298, Jan. 9, 1989, abandoned, which is a continuation of Ser. No. 116,374, Nov. 2, 1987, abandoned.

[51] Int. Cl.⁵ ............................................. H02K 37/00
[52] U.S. Cl. .................... 310/49 R; 310/42; 360/78.13
[58] Field of Search ................... 310/42, 43, 49 R, 89, 310/96, 254, 90; 360/78.13

[56] References Cited

U.S. PATENT DOCUMENTS

| | | | |
|---|---|---|---|
| 3,870,281 | 3/1975 | Fink | 259/1 R |
| 4,714,850 | 12/1987 | Akiba et al. | 310/49 R |
| 4,733,120 | 3/1988 | Kawabe | 310/268 |

Primary Examiner—Peter S. Wong
Assistant Examiner—Judson H. Jones
Attorney, Agent, or Firm—Flehr, Hohbach, Test Albritton & Herbert

[57] ABSTRACT

In summary, the stepper motor of this invention comprises a rotor anbd stator both mounted in a single housing (which may be a part of the base casting as described in the incorporated application) the bearings supporting the rotor for rotation within the housing both being located on the rotor shaft on the same side of the rotor adjacent one another, the opposite end of the single housing being covered with a sealed plastic cover. The bore of the lamination stack that forms the stator is piloted by machined surfaces into a high tolerance fit within the housing, and clamped in place with a simple wave washer/snap ring combination.

29 Claims, 5 Drawing Sheets

SINGLE HOUSING STEPPER MOTOR

This application is a continuation-in-part of U.S. patent application Ser. No. 07/296,298 filed Jan. 9, 1989, now abandoned, which is a continuation of U.S. patent application Ser. No. 07/116,374 filed Nov. 2, 1987, now abandoned.

CROSS-REFERENCE TO RELATED APPLICATION

This invention is especially useful in a disc drive of the type described in U.S. application Ser. No. 914,690 filed Oct. 2, 1986, and incorporated herein by reference.

FIELD OF THE INVENTION

This invention relates generally to stepper motors, and more particularly to a stepper motor designed for use in a disc drive.

BACKGROUND OF THE INVENTION

Stepper motors designed to rotate through a predetermined angle upon application of a sequence of voltage pulses are well known. Such stepping motors are useful in fields where accurate, discrete angular motions reliably responsive to a controlled sequence of pulses are desired. Applications involving frequent repositioning of a mechanical member to successively different positions are ideally adapted for being driven through a linkage by a stepper motor. Thus, stepper motors are commonly used in disc drives to position the head carrying actuator relative to the information storage disc. Pulsed instructions are converted directly to accurate rotational motions by the stepping motor.

A typical stepping motor construction involves a rotor comprising a permanent magnet and one or more magnetically permeable discs having a plurality of teeth on their periphery, and a stator preferably made from magnetically permeable laminations incorporating a number of poles, each pole having a plurality of teeth on the pole surface, and a coil of electrically conductive wire wound around its root. The geometric configuration and the magnetic fields are such that the attraction between rotor and stator teeth result in tangential forces on the rotor that change the angular alignment of the rotor relative to the stator.

Accurate positioning of the rotor relative to the stator is attained by a carefully planned sequencing of voltage pulses to the coils around each stator pole, known as an algorithm. The accuracy of the mechanical alignment between the rotor and the stator portions of a stepper motor is critical in view of the extremely small air gaps between the teeth of the rotor and the teeth of the stator poles. Failure to provide such extremely accurate alignment may result in unacceptably large stepping angle and hysteresis errors, thus adversely impacting production yields.

In conventional stepping motors, the stator comprises two end bells that pilot on the stack of laminations and capture the stack between them while providing support for two rotor bearings, one in each end bell. One of the conditions needed to provide an evenly distributed air gap between the teeth of the rotor and the teeth of the stator poles, the axis of the rotor must coincide as closely as possible with the axis of the lamination stack bore of the stator. Achieving such a condition is difficult due to compliance in the lamination stack and the precision with which the stack and end bells must be machined, which also adds cost to the manufacture of stepping motors.

The disc drive market demands greater speed, increased accuracy in positioning the transducer over the target track, and lower power consumption in the stepper motor. This can best be achieved by optimizing the rotor/stator tooth geometry and dimensioning with improved tolerance compliance, as well as by decreasing the gap between the rotor and the stator. The solution to this problem lies in improved control of rotor and stator fabrication, and the provision of better means for maintaining alignment between the axes of the rotor and stator in the stepper motor, while reducing cost.

SUMMARY OF THE INVENTION

It is an objective of this invention to provide a stepper motor that can be reliably assembled in large quantities, and to provide a precise stepping operation with minimum cost.

Another objective is imposed by the need in disc drive design to reduce the space occupied by the disc drive. Therefore, an objective herein is to provide a stepper motor that can be incorporated in a very small physical package.

A related objective herein is imposed by the constant requirement in the disc drive industry and especially the mass production disc drive industry to provide a highly reliable product at the lowest possible cost. Therefore, it is a specific objective to provide a stepper motor that can be reliably assembled at a relatively low cost. A related objective herein is to provide a stepper motor design incorporating construction features such that in the event of a necessity for reworking of the motor, such reworking can be easily done.

A further objective herein is to provide a stepper motor in which the alignment of the rotor and the stator can be consistently, reliably achieved even without the imposition of overly precise tolerances.

A further and related objective herein is to provide a stepper motor for use in a disc drive which lends itself to a fully sealed design, to eliminate contamination in the head-disc assembly (HDA).

A related objective is to provide a disc drive design wherein the base casting is an integral part of the housing of the drive to further simplify manufacture and assembly.

In summary, the stepper motor of this invention comprises a rotor and stator both mounted in a single housing (which may be a part of the base casting as described in the incorporated application) the bearings supporting the rotor for rotation within the housing both being located on the rotor shaft on the same side of the rotor adjacent one another, the opposite end of the single housing being covered with a sealed plastic cover. The bore of the lamination stack that forms the stator is piloted by machined surfaces into a high tolerance fit within the housing, and clamped in place with a simple wave washer/snap ring combination.

These symmetrically arranged flats serve a significant function during assemblies and fabrication of the stator stack. The final accuracy of the assembled motor is greatly influenced by the precision with which the stator stack matches the extremely accurate design. The stator is assembled of a plurality of individual laminations, each manufactured with precision die stamping equipment from thin sheet stock. Even the most precisely made manufacturing die set will, however, have variations, due to unavoidable tolerance differences, from the nominal design dimensions. The symmetrically arranged flat surfaces allow each lamination to be rotated 1/10 of a revolution upon being stacked on the preceding lamination to distribute any dimensional errors evenly around the stator stack, thus preventing any flaws in the fabrication tool from having a significant impact on the accuracy of the stack took pattern.

Further, a preferred embodiment comprises a sealing plastic cover provided with a special pressure finger to hold the wires running to the stator coils away from the sharp edges of the stack wave spring and snap ring; the cover is also specifically designed to capture the wires to relieve any strain on the wires.

In an alternative embodiment, where the bearings are located on opposite sides of the rotor, the bore of the stack is piloted into a precisely aligned position on an inner wall of the housing adjacent the front bearing, the other end of the stack being held in place by a bearing holder interposed between the rear bearing and the edge of the stack. The bearing holder is pressed into secure contact with the stack by a special spacing forced into engagement with a groove in the housing. The holding forces generated by the spring are precisely defined to insure the accurate alignment of the stator with the rotor of the stepper motor.

In a preferred embodiment of the alternative, this bearing holder includes an annular groove filled with a silicon rubber or similar semi-compliant material to allow for thermal differential expansion of the surface of the bearing against the surface of the bearing holder as well as to damp out vibrations between the bearing and the stator.

The preload of the bearings within the envelope of the single housing is preferably fixed using a screw threaded into the inside of the shaft adjacent the rear bearing holder.

Independent of the bearing preload system, in a preferred embodiment the entire assembly, including the rear bearing, bearing holder and stator support, as well as the stator is held together with a star-shaped spring comprising a plurality of fingers that slide into and rotate within slots in the housing in a bayonet arrangement. These slots allow insertion of the star-shaped spring under pressure, and rotation under pressure within the groove to a seated position.

In embodiments of this motor in which a magnetic seal is used, no cover is necessary. However, if a cover is desired, the same groove as holds the spring then accepts a plastic cover, preferably inserted through the same openings as the bayonet arms of the spring. Typically, the cover is rotated in the groove to hold the spring in place.

BRIEF DESCRIPTION OF THE DRAWINGS

The objectives, features and advantages of this invention will be apparent from the description of a preferred embodiment, as illustrated in the drawings, wherein.

DETAILED DESCRIPTION OF PREFERRED EMBODIMENT

Figure 1:
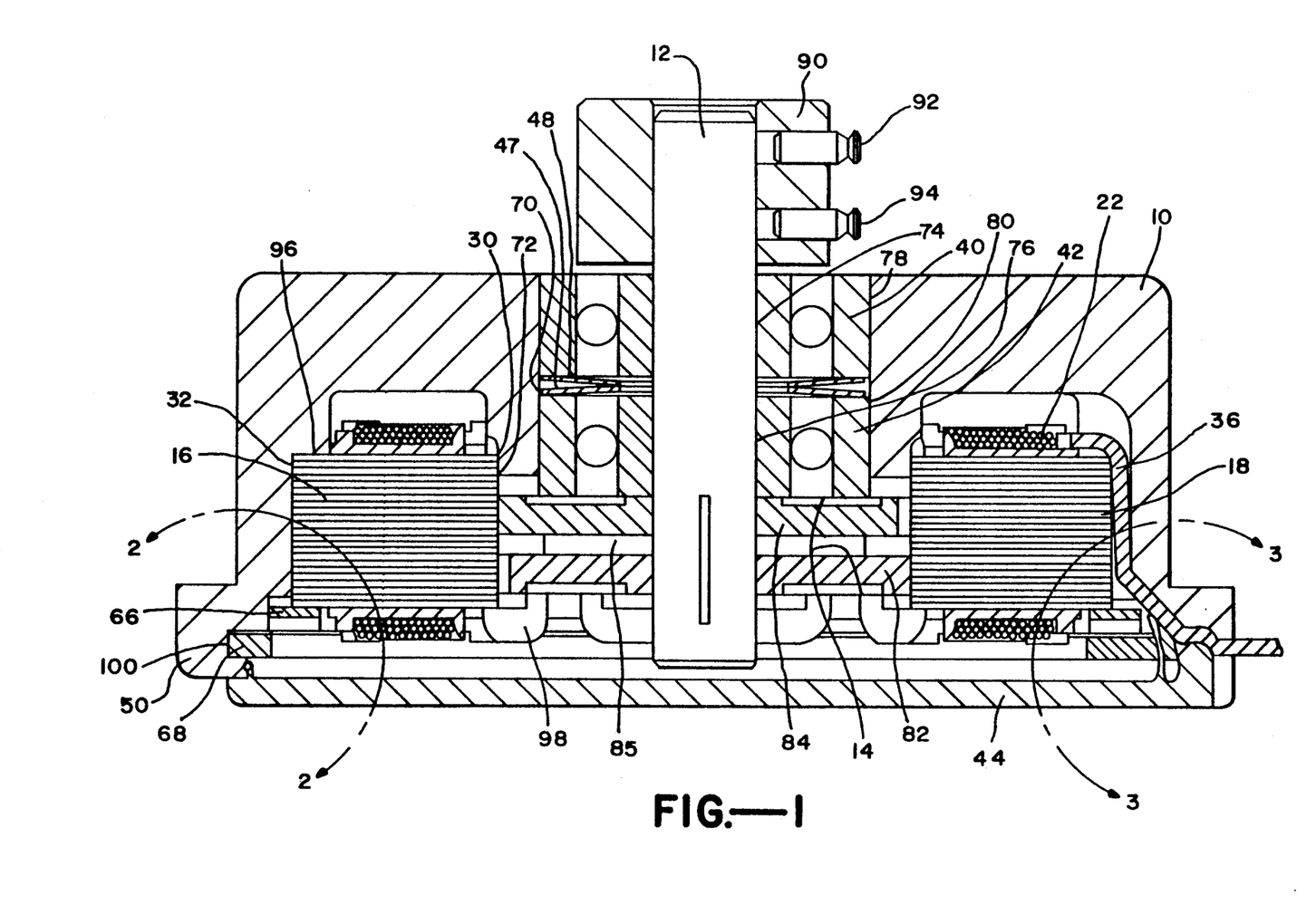
FIG. 1 is a vertical sectional view of this invention, the section being along line B—B of FIG. 4B.
Figure 4A:
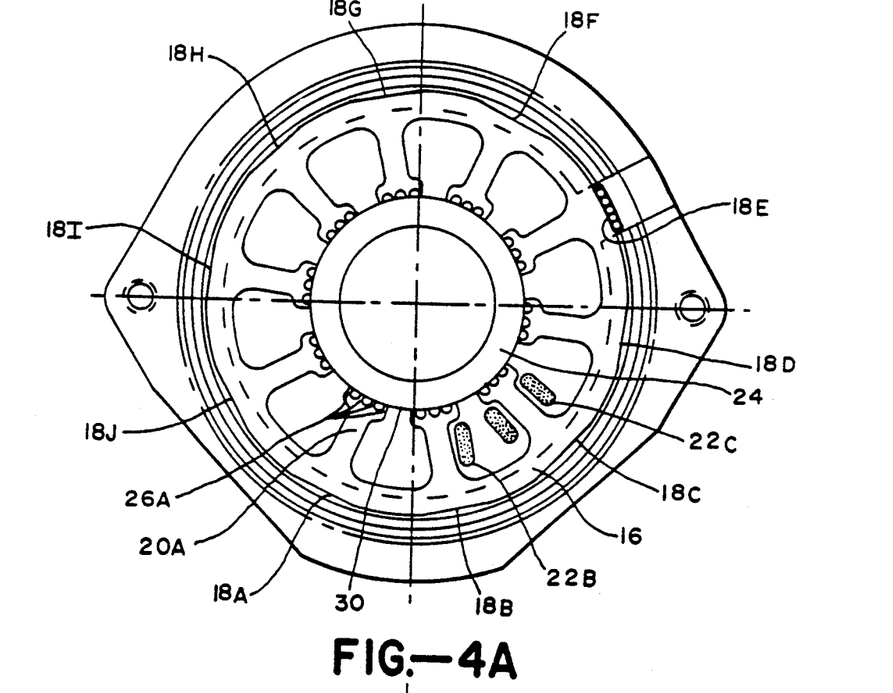
FIGS. 4A and 4B are plan views of the motor of this invention showing the relationship of the rotor, shaft and stator of the assembled motor.

FIG. 1 is a vertical section of the preferred embodiment of a stepper motor disclosed and claimed herein. All the components of this stepper motor are mounted in a single housing 10, which could be cast and machined as an integral part of the base casting of the disc drive. The essential elements of this motor design comprise the shaft 12 carrying a rotor 14, rotating with a stator 16 formed as a laminated stack. A plan view of the stator 16 is shown in FIG. 4A, where the laminated stack is shown to have an outer surface in the shape of an interrupted decagon. That is, the outer surface of the stack has ten flat sides 18A-18J, so that the individual laminations that form the stack may be properly aligned during the stack assembly. The flats of this ten-sided symmetrical figure are each opposite a pole 20A-J of the stator.

Windings 22A, B, C for each phase are wound on the stator poles 20A, B, C. As appears clearly in the illustration of FIG. 4B, each stator pole 20A-J has a winding 22A-J thereon for selective energization to cause rotation of the rotor 24. The end of each stator pole has a plurality of teeth 26 facing the rotor teeth 27, the pitch of the rotor and stator teeth together with the location of the poles on the stator governing the rotation of the rotor 24 for each step. An advantage herein is that clearance between the stator teeth 26 and the rotor teeth 27 can be minimized because of the stator and rotor alignment means disclosed herein.

Returning to FIG. 1, one can see that a portion of the stator stack bore is accurately aligned with the inner annular surface 30 of housing 10 and perpendicularly seated against flat surface 96 of the same housing. Since the ball bearing bore 46 of housing 10 is machined simultaneously with the pilot surface 30 and the seating surface 96 of housing 10, the alignment between the stator stack 16 and the rotor 14 is maintained, while encompassing the stator 16 within the single envelope of housing 10, rather than using a pair of end bells as is required by the prior art.

In the preferred embodiment of the design shown in FIG. 1, the rotor shaft 12 is supported by a pair of bearings 40, 42, both mounted within the housing 10 toward the same end of the rotor shaft 12 and on the opposite side of the rotor 14. In FIG. 1, both ball bearings 40, 42 are shown guided into a single machined cylindrical bore 46 in the housing 10. The bearings are separated by a pair of Belleville springs 47, 48 arranged to establish a biasing force against the outer race of each bearing toward the outer ends of the shaft in order to remove the clearances present in a conventional ball bearing and provide the alignment and stiffness for the rotor within the stator. By using the single cylindrical opening 46 in the housing 10 and locating bearings 40, 42 side by side, the chances of misalignment of the rotor shaft are minimized. In contrast, in the prior art where two end bells are used, construction of the motor incorporates three main separate pieces. The alignment of the stator and rotor are then controlled by the parallelism and compliance of the stack, the concentricity of the stack bore with its outer piloting diameters, and the concentricity of the front and rear end bells with the bearing bores therein. This is a difficult task on a mass production level. This invention minimizes these problems, lending itself to mass production of high reliability stepper motors.

A further advantage of this design is that it is a sealed design (a requirement of some disc drive manufacturers). The seal is accomplished in the preferred embodiment of FIG. 1 by providing that the open end of the housing below the rotor 14 and stator 16 is covered with a plastic, snap-on cap 44 that covers the housing 10 below the end of the shaft 12. The advantage of incorporating the snap-on cap 44 is that if rework of the motor becomes necessary, the cap can be easily snapped off. Typically, a slot can be provided in the cap 44 which can be engaged by a screw driver to snap the cap off the housing.

Figure 2:
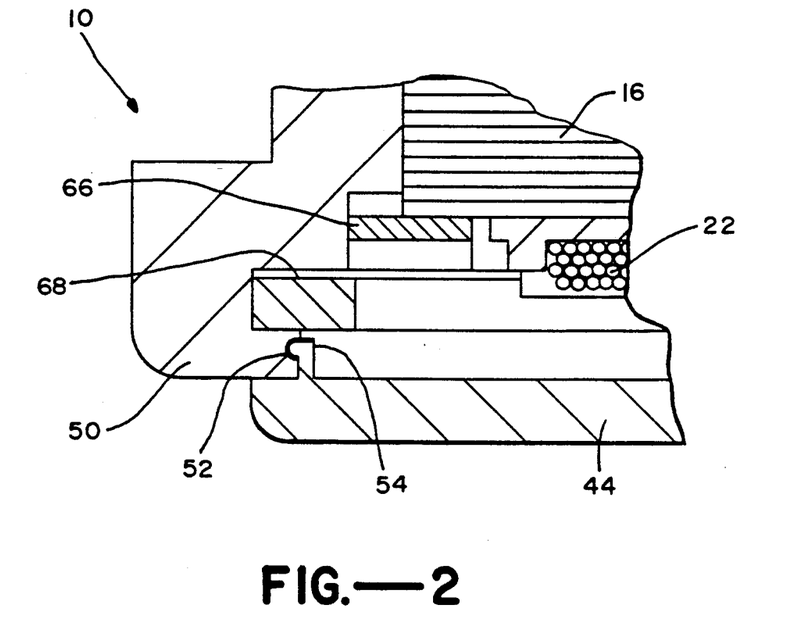
FIG. 2 is an expanded detail view of the portion of FIG. 1 marked by the circular arrow 2.

As shown in detail in FIG. 2, identified by Detail 2 in FIG. 1, the lower portion of the housing 10 includes a flange 50 having a circumferential groove 52. The circumferential groove 52 receives a circumferential protrusion 54 carried on the cap 44, which protrusion 54 is pressure fit when snapped into the groove to hold the cap in place.

Figure 3:
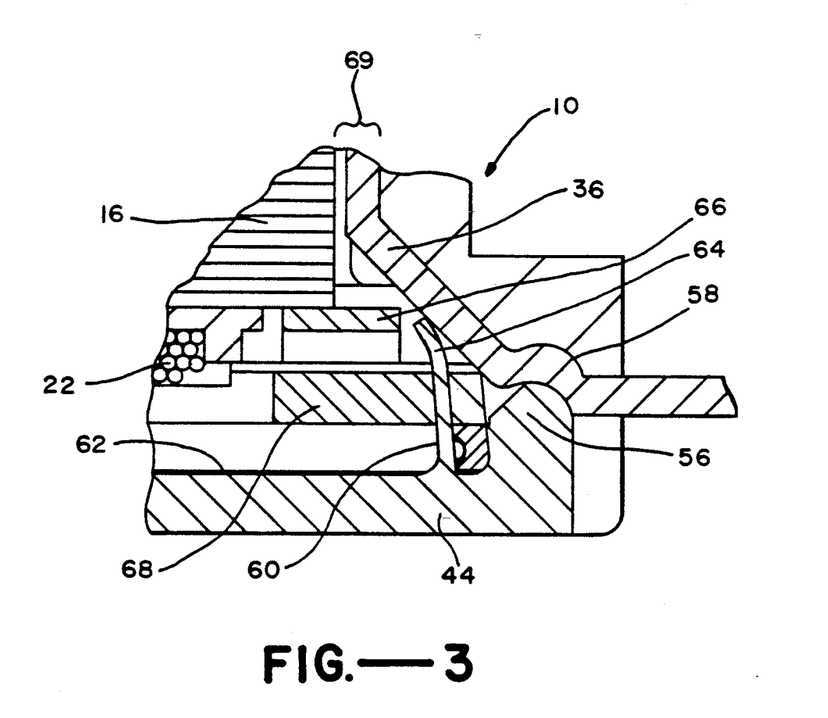
FIG. 3 is an expanded detail view of the portion of FIG. 1 marked by the circular arrow 3.

FIG. 3, which is the detail identified by Detail 3 in FIG. 1, illustrates a different section through the cap 44 and housing 10. Specifically, FIG. 3 illustrates incorporation of a strain relief 56 to reduce the strain on the ribbon cable 36. A tongue 56, provided to function as this strain relief is defined as a portion of the cap 44, which pushes the cable 36 up into a pocket 58 in the housing 10 in a limited region of the housing 10 where the flange 50 shown in FIG. 2 is not present. By pushing this tongue 56 against the cable 36, the cable is compressed and captured tightly between the cap 44 and the housing 10, insuring that no undue strain can be conveyed from the wires outside housing 10, as they run back to the coils 22 through housing 10. Just inside the strain relief tongue 56, an extended finger 60 is provided reaching out from surface 62 of the cap 44 to contact and press against the ribbon cable 36. This resilient finger 60 is provided so that its distal end 64 contacts the ribbon cable 36 in an area adjacent to the wave washer 66 and snap ring 68 which are used to hold the stator laminations 16 in place. In this way, the ribbon cable is biased away from and kept out of contact with the wave washer 66 and snap ring 68, both of which have sharp edges which could cut or damage the cable 36.

Several other features and advantages will become apparent by consideration of the assembly of the invention. For example, a classic problem in the assembly of a motor of this type is keeping the stator concentric with the rotor for free and clear rotation of the rotor relative to the stator.

Referring again to FIG. 1, the stator 16 is piloted on a machined cylindrical internal surface 30 into the housing 10. This cylindrical housing surface 30 is machined very concentric with the cylindrical surface 70 that defines the position of the bearings 40, 42. In this way, the diametrical tolerances at the inside diameter of the stator 16 which are set to very closely match the machined surface 30, insure that when the stator 16 is inserted in housing 10, it centers itself on the piloting surface 30. This is significant in the assembly of the motor of this invention, as the design is defined by very small air gaps between the stator 16 and the rotor 14. The shaft 12 is centered by the bearings 40, 42 which are, as explained above, precisely located by the cylindrical surface 70 defining the edge of the common bearing bore in the housing 10. The slightly rounded corner 72 at the leading edge of the cylindrical piloting surface 30 allows the stator stack 16 to center itself into position upon insertion.

A further advantage of this design is that a pre-assembled bearing cartridge including bearings 40, 42 and Belleville springs 47, 48, can be inserted in place using adhesives. This is called a 4-surface adhesion lock. That is, inner surfaces 74, 76 of the inner races, and outer surfaces 78, 80 of the outer races of the bearings 40, 42 are locked to the shaft 12 and housing 10, respectively. Even though the bearings 40, 42 and housing 10 may be made of dissimilar materials, the center-to-center distance of the two bearings 40, 42 is small compared to known designs wherein one bearing is located on each end of the motor. Thus axial differential thermal expansion will not significantly affect the pre-set load. This design leads to further manufacturing economies.

In assembling the motor, the rotor assembly, before its placement in the housing 10, has the rotor segments 82, 84, separated by permanent magnet 85, placed thereon with the teeth of the rotor segments 82, 84 precisely offset by a half tooth pitch. Then the rotor assembly comprising shaft 12, bearings 40, 42, Belleville springs 47, 48, segments 81, 84 and magnet 85, is placed in the housing 10. When the adhesive bonding the inner races of bearings 40, 42 to shaft 12 is cured, the Belleville springs 47, 48 will define the permanent diverging axial preload forces of bearings 40, 42. At this point, the pulley 90 incorporating pins 92, 94 used to attach the typical bands of an actuator in a disc drive, is press fitted on the end of the shaft. Prior to this step, if the bearing 40 is a ball bearing with integral magnetic seal, the magnetic fluid is inserted. One should note that this assembly makes use of a rotor shaft which does not have any steps, i.e., a single diameter rotor shaft.

Figure 4B:
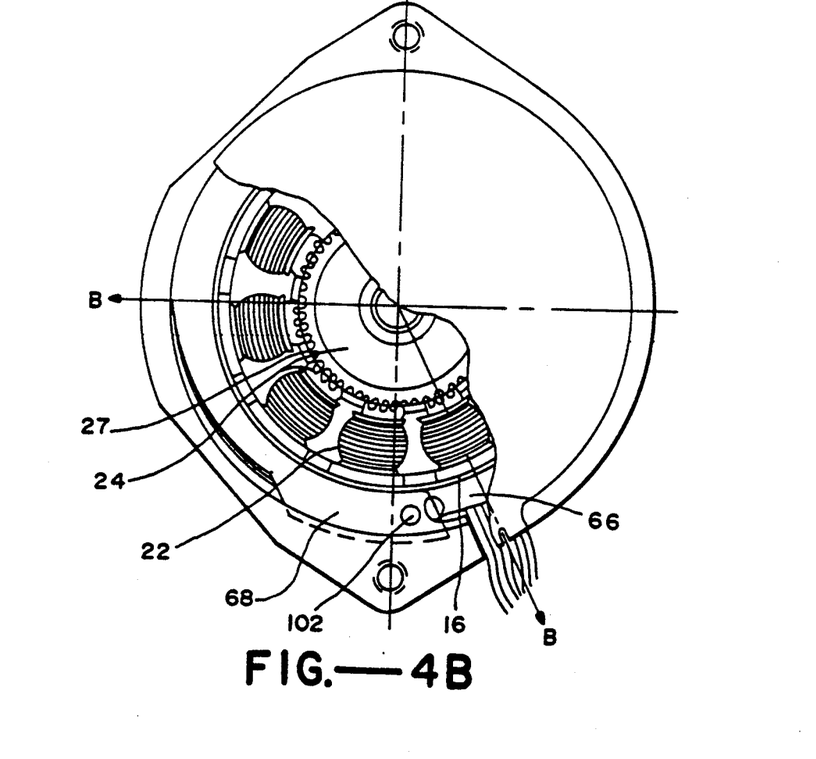

The stator 16 is inserted in place, piloted against the cylindrical surface 30 of housing 10 for precise location relative to the rotor 14, and resting against the machined surface ledge 96 to maintain the stator lamination stack 16 perpendicular to the central bore. Plastic bobbins 98, 99 are used to hold the wires of the coils 130A-J in place. The lead wires 36 to the coils are led out through a special wiring channel provided by one of the flat surfaces 18 of stator stack 16, adjacent to the housing 10 (see also FIG. 4A). FIG. 4B illustrates the means for holding the stator stack 16 in place in the housing 10. In this embodiment, the stator stack is retained under compression against surface 96 of housing 10 with the wave washer 66 held in place using a snap ring 68 which is pressed against the wave washer and fitted into a machined annular channel 100 in the housing flange 50. The snap ring 68 includes eye holes (one is shown as 102) which can be used to compress the diameter of the snap ring to press it against the wave washer and into the machined annular channel 100, while leaving an opening in the snap ring through which the lead wires 36 can be passed.

Figure 5:
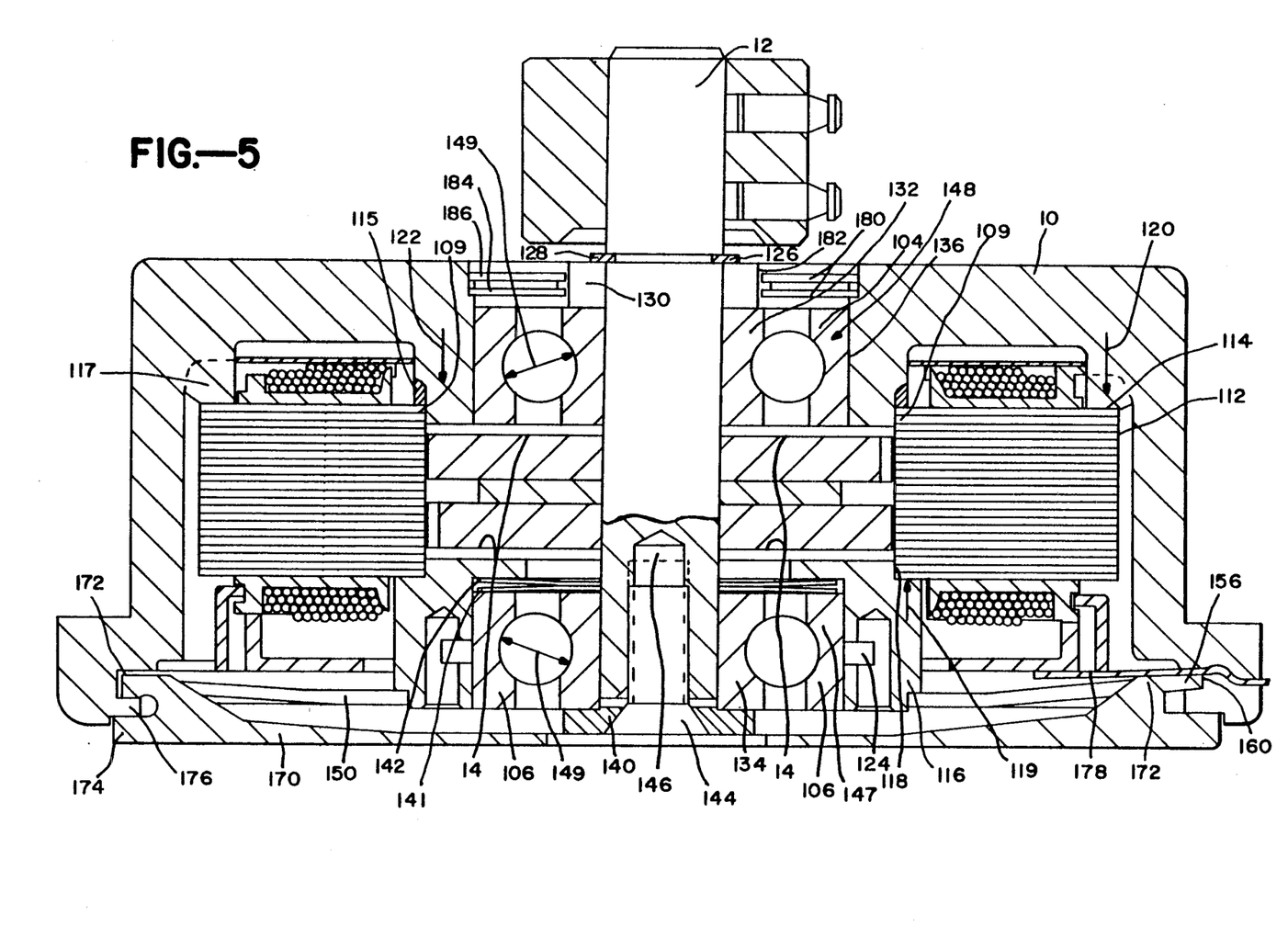
FIG. 5 is a vertical, sectional view of an alternative embodiment of the motor of FIG. 1.

FIG. 5 shows an alternative embodiment of a stepper motor using a single housing to hold all the elements of the stepper motor. In the embodiment of FIG. 5, the housing 10 incorporates a structure in which the shaft 12 is supported for rotation by front and rear bearings 104, 106, respectively. These bearings 104, 106 straddle the rotor indicated generally at 14. In such an arrangement, it is important to note that a primary achievement in this invention is combining the two ball bearings 104, 106 in the single housing 10, although the front and rear bearings 104, 106 are located on opposite sides of the rotor 14. In contrast to the prior art wherein two separate end bells were screwed together or otherwise attached to form the motor housing which supports the stack of stator laminations 16, in this invention a unique method of supporting the stator stack 16 is provided within the single housing envelope 10. This inventive arrangement prevents misalignment of the rotor 14 relative to the stator 16, a common deficiency of the prior art.

Of critical importance in achieving optional alignment of stator 16 and rotor 14 is the piloting of the stator stack 16 on the inner wall portion 110 of the housing 10 and the seating of top surface portion 112 of the stator 16 against a machined annular shoulder surface 114 of the housing 10. Finally, the rear bearing holder 116 pilots on the opposite inner edge 118 of the stator 16. In this way, when the stator 16 is clamped inside the housing 10 by spring 150 (described later) acting on the bearing holder 116, the forces represented by the arrows 119, 120 are set up on opposite sides in annular patterns around the stator stack. These forces 119, 120 combine with the piloting effect of the mating annular surfaces at 110, to forcibly and positively align the stator stack 16 in the housing 10.

In an alternative embodiment, the recessed annular region 122 of the stator stack could be filled in as shown in FIG. 5, forming a machined surface 123 in line with surface 114 that will axially support the stator 16. As a consequence, the machined annular surface 114 could be eliminated as shown at the left side of FIG. 5 at segmented line 117, as the force indicated by arrow 120 necessary to balance the force indicated at arrow 119 could now be balanced by a new force which is created at the filled-in shoulder as indicated by the arrow 122.

Another significant element of this embodiment is the rear ball bearing holder 116, and manner in which it interacts with the stator 16. Ball bearing holder 116 houses the rear bearing 106 which is also mounted on the shaft 12. As a preliminary matter, it is important in this and the following embodiments that the rear bearing support 116 be of a non-magnetic material. This is important because it is located in finite contact with the stator 16 and in close proximity to the rotor 14. If the rear bearing support 116 were of magnetic material, this could have a damaging effect on the magnetic fields created during operation of the motor, and thereby negatively influence the performance of the motor. The same is true of the housing 10 which supports the motor structure. It is also important to select the material of the housing 10 and rear bearing support 116 to have a thermal coefficient of expansion as close as possible to that of the material of the laminated stator stack 16. In this way, the motor, and therefore the disc drive, can be operated over the full temperature range for which a disc drive is specified, without damaging effects on the performance of the motor due to thermal misalignment.

A further significant feature of this invention is the provision of an annular channel 124 in rear bearing holder 116 surrounding the rear bearing and filled with a resilient material such as silicon rubber. The purpose of providing this annular channel 124 filled with a resilient material is to perform two functions. First, this allows for differential thermal expansion of the rotor assembly including the bearings relative to the rest of the motor. This is important because in the present design, all elements of the motor are effectively mechanically coupled, whereby a differential expansion between the outer and the inner elements could result in a modification of the pre-load on the motor bearings. Further, the provision of this resilient material constrains the outer bearing surface such that any vibrations that may occur in the rotor are damped out rather than being transmitted through the bearing support 116 to the remaining elements and specifically the stator of the motor.

The entire motor is assembled using a unique arrangement that relies in part on a snap ring 126 inserted in an annular channel 128 in the front portion of the shaft 12 at the front of the housing. This snap ring 126 is used to restrain the position of a sleeve 130 which in turn is pressed against the inner race 132 of front ball bearing 104. This ball bearing 104 is locked in place between the shaft 12 and an inner surface 136 of the housing 10. The desired axial preload in this system is achieved by loading a pair of Belleville springs 141, 142 between the outer race of ball bearing 106 and the lip 140 of bearing support 116, and locking this preload in place with a screw 144 which is threaded and seated in a bore 146 internal to the shaft 12. This constitutes a DB preload configuration, a type known in this technology, which effectively locks in place diverging forces to provide a highly stable rotor for the stepper motor. In this configuration, the outer races 147, 148 of the front and rear bearings 104, 106 are effectively forced away from each other with the force vectors diagonally crossing the balls and intersecting the shaft, toward its outer ends, further stabilizing the shaft 12 as defined above. Of course, the Belleville springs 141, 142 can be replaced by other known resilient means such as wave washers or the like that can provide the proper force between two facing surface as required.

Figure 6:
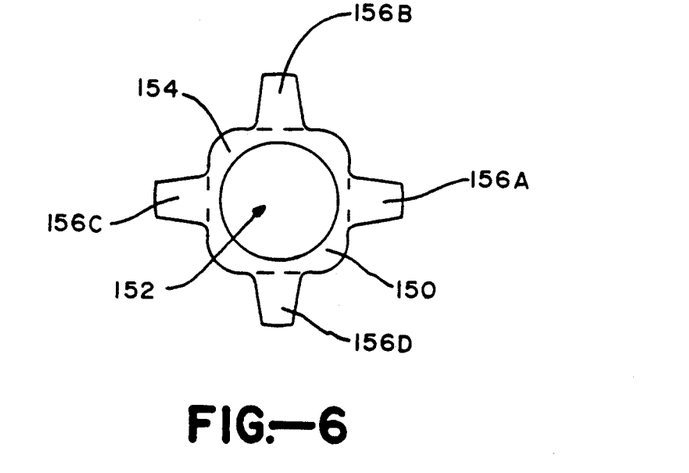
FIG. 6 is a plan view of the spring retainer used to hold together the motor of FIG. 5.
Figure 7:
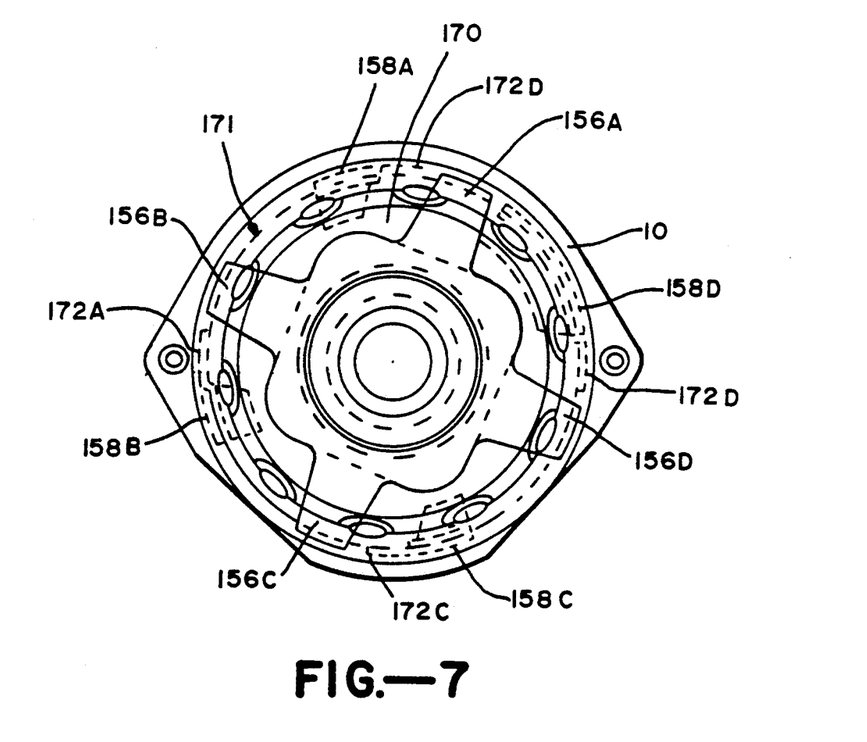
FIG. 7 is a bottom plan view of the motor of FIG. 5 with the cover removed.

As a means of rigidly holding this motor together under appropriate compressive forces while allowing for ease of assembly and access to the interior of the motor, a star-shaped spring 150 is provided shown in cross section in its assembled form in FIG. 5, in a plan view in FIG. 6, and as it appears inserted in housing 10 in FIG. 7. As clearly appears in the plan view of FIG. 6, the star-shaped spring 150 includes a central framing portion 154 having an opening at the center thereof 152, where the spring may be fitted over the rear bearing support 116 as shown in FIG. 5. Thus, the framing portion 154 of the star-shaped spring 150 biases the rear bearing support 116 against the rear of the stator 16 along the annular line of force 119 discussed above to lock in position the stack 16 within the housing 10. A plurality of fingers 156A-D are provided which, as appears most clearly in FIG. 7, are inserted in notches 158A-D on the inner rim of the housing 10, the notches 158A-D opening into an annular channel 160. After insertion, the fingers 156A-D may be rotated through the annular channel 160, the housing 10 to be seated in a position from which they cannot be easily disturbed. The star-shaped spring is made of a spring-like material such as a high tensile strength stainless steel.

In summary, the star spring of FIGS. 6-7 allows all the elements herein to be constrained and maintain a constant relative relationship without the use of screws. This is important, and they are additional parts to handle and add cost both in terms of materials and assembly time. The cover 170 appears in sectional form in FIG. 5. This cover completely covers and seals the housing against the entry of dirt.

The embodiment of FIG. 5 comprises a dual pole magnetic seal 180 affixed at the outer diameter by an adhesive to the housing 10, the inner diameter being separated by two narrow gaps 182, 183 from the spacer 130, which is made out of a magnetically permeable material. These gaps 182, 183 are filled with a magnetically conductive fluid material to form the magnetic seal and close the magnetic path between spacer 130 and magnetic seal 180. It should be noted that since the shaft 12 is of a non-magnetic material, it is essential to provide a sleeve 130 rotating with the shaft to close the magnetic path. As can be seen, the magnetic path closes upon itself in this embodiment, with the path generally being traced from the magnet 184 through pole 185, gap 183, sleeve 130, gap 182, pole 186, and back to magnet 184. It would also be possible to replace the embodiment shown herein with magnetic seals of other configurations.

It is also important that the inner surface of the sleeve 130 next to the front bearing 104 be hermetically sealed against the shaft 12, and that the magnetic seal 180 be sealed at its outer edge against the housing 10 to maintain the static sealing of the motor.

The structure, features and advantages of this invention have been described above. Alternatives to the scope of this invention may become apparent to a person of skill in the art who studies this invention disclosure. Therefore, the scope of this invention is to be limited only by the following claims.

What is claimed:

1. A stepper motor comprising
   a single housing bell for supporting the elements of said motor, said housing comprising a single end wall and a cylindrical side wall,
   a support shaft mounted for rotation in said housing end wall,
   a rotor of said motor being mounted for rotation with said shaft in said housing bell,
   a stator fixedly mounted in said housing and having a plurality of coils wound thereon, selective activation of said coil causing step-by-step rotation of said rotor, said housing including at least one inner surface internal to said housing and adapted to guide said stator into a predetermined position in said housing and support said stator in said position.
   and bearing means for supporting said rotor for said selective rotation in response to said selective activation of said coils, said bearing means including front and rear bearings on opposite sides of said rotor and a rear bearing holder piloted to support a corner of the stator.

2. A stepper motor as in claim 1 wherein said cylindrical side wall of said housing is joined to said end wall at one end and is open at the other end, and including a plastic cover press fitted over said open end of said side wall to seal the region enclosed by said housing against contamination.

3. A stepper motor as in claim 2 wherein said open end of said side wall includes a flange having a matching recess on the inside thereof, said plastic cover including a lip adapted to fit within said recess to enclose said opening.

4. A stepper motor as in claim 1 wherein said single housing is an integral part of a base casting for a disc drive housing.

5. A stepper motor as in claim 2 including a plurality of control wires connected to said coils for selectively energizing said coils, said wires being led out of said housing between said open end and said cover, wherein said cover comprises a finger extending above said cover against said housing to hold said wires against said housing.

6. A stepper motor as in claim 1, said inner cylindrical surface terminating in an annular shoulder facing the top surface of the upper inner corner of the stator whereby said stator is reliably supported in the housing.

7. A stepper motor as in claim 1 wherein the means for supporting the stator in the housing includes a wave washer supporting the stator relative to the shaft in the housing and biasing said stator into position, and a snap ring located adjacent said washer and pressed against said washer, and elastically snapping into a groove in the housing to lock the wave washer into position in the housing below the stator.

8. A stepper motor as in claim 1 wherein said housing comprises a flange with a groove defined therein, spring means including a flexible member located below said stator for urging said stator into position, and a snap ring biased in said groove for holding said flexible member in position.

9. A stepper motor as in claim 8 wherein said flexible member comprises a wave washer supported against a shelf below said stator by said snap ring.

10. A stepper motor as in claim 9 wherein said cylindrical side wall of said housing is integral with said end wall at one end and is open at the other end, and including a plastic cover press fitted over said open end of said side wall to seal the region enclosed by said housing against contamination.

11. A stepper motor as in claim 10 wherein said open end of said side wall includes a flange having a matching recess on the inside thereof, said plastic cover including a lip adapted to fit within said recess to enclose said opening.

12. A stepper motor comprising
   a single housing for supporting the elements of said motor, said housing comprising a single end wall and a cylindrical side wall,
   a support shaft mounted for rotation in said housing end wall,
   a rotor of said motor being mounted for rotation with said shaft in said housing bell,
   a stator fixedly mounted in said housing and having a plurality of coils wound thereon, selective activation of said coil causing step-by-step rotation of said rotor,
   front and rear bearing means mounted on either side of said rotor to support said rotor for said selective rotation in response to energization of said stator coils,
   means for supporting said rear bearing on said shaft, and
   means between said stator and said rear bearing for positioning said stator relative to said bearing and said rotor and thereby defining a close tolerance relationship of the elements of said motor.

13. A stepper motor as in claim 12 including a star-shaped spring aligned with said rear bearing holder to support said rear bearing holder and said stator in aligned relationship in said housing.

14. A stepper motor as in claim 12 wherein said inner surface of said housing includes an annular shoulder positioned to abut the upper outer corner of said stator to reliably position said stator in said housing relative to said rotor.

15. A stepper motor as in claim 1 wherein said stator is supported concentric with said bearings.

16. A stepper motor as in claim 12 wherein said inner surface of said housing terminates in an annular shoulder facing a top surface of said stator whereby said stator is reliably supported in said housing.

17. A stepper motor as in claim 16 wherein said annular shoulder, said inner surface and a bearing bore into which said rear bearing holder is piloted are simultaneously machined in said single housing whereby said rotor, said stator and said bearings are reliably positioned relative to one another in said housing.

18. A stepper motor as in claim 17 wherein said rotor is cantilevered from said shaft in said housing between said bearings and a plastic cover press fitted over an open end of said housing, whereby said rotor rotates precisely relative to said stator.

19. A stepper motor as in claim 12 wherein said rear bearing holder supporting said stator is of non-magnetic material.

20. A stepper motor as in claim 14 wherein said inner surface is machined simultaneously with said annular shoulder and a bore for at least one of said bearings in said housing.

21. A stepper motor as in claim 20 wherein said housing comprises an open end having a flange with a groove defined therein, spring means including a flexible member located below said stator for urging said stator into position, and a snap ring biased in said groove for holding said flexible member in position.

22. A stepper motor as in claim 21 wherein said elastic member comprises a wave washer supported against a shelf below said stator by said snap ring.

23. A stepper motor as in claim 1 wherein said inner surface includes an annular shoulder positioned to abut the upper surface of said stator to reliably position said stator in said housing relative to said rotor.

24. A stepper motor as in claim 20 wherein said rear bearing holder is of non-magnetic material.

25. A stepper motor as in claim 24 wherein said housing and said rear bearing holder are formed of a material having a coefficient of expansion as close as possible to that of said stator to minimize thermal misalignment over a range of operating temperatures.

26. A stepper motor as in claim 25 wherein said rear bearing holder includes an annular channel surrounding said bearing, and a layer of resilient material filling said channel and surrounding said bearing, thereby damping vibrations which may otherwise effect the stator of said motor.

27. A stepper motor as in claim 25 including resilient means located between a surface of said rear bearing and a lip of said bearing holder, and means cooperating with said rear bearing holder for locking an axial preload established by said resilient means in place.

28. A stepper motor as in claim 27 including a screw inserted in a slot threaded into said shaft to lock said rear bearing, said resilient means and said rear bearing holder and spindle support into their relative positions, to establish the preload in said system.

29. A stepper motor as in claim 1 wherein the means for supporting the stator in the housing includes a wave washer supporting the stator relative to the shaft in the housing and biasing said stator into position, and a snap ring located adjacent said washer and pressed against said washer, and elastically snapping into a groove in the housing to lock the wave washer into position in the housing below the stator.

* * * * *

UNITED STATES PATENT AND TRADEMARK OFFICE
CERTIFICATE OF CORRECTION

PATENT NO. : 4,992,686

DATED : February 12, 1991

INVENTOR(S) : Gunter K. Heine, Enrique G. Klein, Oswald Kuwert, Bernhard M. Seeger It is certified that error appears in the above-identified patent and that said Letters Patent is hereby corrected as shown below:

Cover Page at [75] change the second inventor's last name as follows: from "Kewert" to --Kuwert--.

Signed and Sealed this

Fifteenth Day of September, 1992

*Attest:*

DOUGLAS B. COMER

*Attesting Officer*      *Acting Commissioner of Patents and Trademarks*